United States Patent
Shi et al.

(10) Patent No.: US 8,804,483 B2
(45) Date of Patent: Aug. 12, 2014

(54) SYSTEM AND METHOD FOR TRANSMISSION AND DETECTION OF FRAME INCLUDING BURSTS OF PULSES

(75) Inventors: Jun Shi, San Diego, CA (US); David Jonathan Julian, San Diego, CA (US); Amal Ekbal, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 352 days.

(21) Appl. No.: 12/702,017

(22) Filed: Feb. 8, 2010

(65) Prior Publication Data
US 2011/0038309 A1 Feb. 17, 2011

Related U.S. Application Data

(60) Provisional application No. 61/230,312, filed on Jul. 31, 2009.

(51) Int. Cl.
| H04J 7/00 | (2006.01) |
| H04J 9/00 | (2006.01) |
| H04W 4/00 | (2009.01) |
| H04L 25/493 | (2006.01) |
| H04L 25/00 | (2006.01) |
| H04B 1/69 | (2011.01) |

(52) U.S. Cl.
CPC ............ *H04L 25/00* (2013.01); *H04L 25/493* (2013.01); *H04B 2001/6908* (2013.01)
USPC ............................ 370/213; 370/205; 370/328

(58) Field of Classification Search
USPC .................. 370/205, 212, 213, 310–350, 533
See application file for complete search history.

(56) References Cited

U.S. PATENT DOCUMENTS

| 5,495,503 | A | 2/1996 | King et al. |
| 5,684,871 | A | 11/1997 | Devon et al. |
| 6,031,862 | A * | 2/2000 | Fullerton et al. ............... 375/146 |

(Continued)

FOREIGN PATENT DOCUMENTS

| CN | 1611011 A | 4/2005 |
| CN | 1650535 A | 8/2005 |
| JP | 2007036593 A | 2/2007 |
| WO | WO03030581 | 4/2003 |

OTHER PUBLICATIONS

International Search Report and Written Opinion—PCT/US2010/043896, International Searching Authority—European Patent Office, Nov. 3, 2010.

(Continued)

*Primary Examiner* — Warner Wong
(74) *Attorney, Agent, or Firm* — Paul S. Holdaway (57) ABSTRACT

A method of transmitting and receiving data frames using pulses is disclosed. According to the transmitting method, a first signal is transmitted including one or more bursts of pulses during a first portion of a transmission frame, and not transmitting the first signal during a second portion of the transmission frame. The not transmitting the first signal may include maintaining one or more silence periods for the second portion of the transmission frame, or transmitting a second signal distinct from the first signal. According to the receiving method, a signal including one or more bursts of pulses is received during a first portion of a transmission frame, an analysis of the one or more bursts of pulses is performed, and the transmission frame is detected based on the analysis of the one or more bursts of pulses.

46 Claims, 8 Drawing Sheets

(56) References Cited

U.S. PATENT DOCUMENTS

| | | | |
|---|---|---|---|
| 6,212,230 B1* | 4/2001 | Rybicki et al. | 375/239 |
| 6,456,221 B2* | 9/2002 | Low et al. | 341/157 |
| 7,079,604 B1* | 7/2006 | Miller et al. | 375/343 |
| 7,280,607 B2* | 10/2007 | McCorkle et al. | 375/295 |
| 7,366,235 B2* | 4/2008 | Mimura et al. | 375/239 |
| 7,769,072 B2* | 8/2010 | Abou Rjeily et al. | 375/130 |
| 8,625,661 B2* | 1/2014 | Lee et al. | 375/238 |
| 2001/0019312 A1* | 9/2001 | Joe | 341/133 |
| 2001/0033576 A1* | 10/2001 | Richards | 370/442 |
| 2005/0020206 A1* | 1/2005 | Leeper et al. | 455/41.2 |
| 2005/0152329 A1 | 7/2005 | Krishnan et al. | |
| 2006/0203795 A1* | 9/2006 | Welborn et al. | 370/345 |
| 2007/0234186 A1 | 10/2007 | Mo et al. | |
| 2009/0129460 A1* | 5/2009 | Nakasha | 375/238 |
| 2010/0182993 A1* | 7/2010 | Jurgensen et al. | 370/350 |
| 2010/0309875 A1* | 12/2010 | Flury et al. | 370/329 |

OTHER PUBLICATIONS

Zhao, et al., "An Efficient IEEE 802.11 ESS Mesh Network Supporting Quality-of-Service" IEEE Journal on Selected Areas in Communications, IEEE Service Center, Piscataway, US, vol. 24, No. 11, Nov. 1, 2006, XP011142600.

Taiwan Search Report—TW099125467—TIPO—May 3, 2013.

* cited by examiner

SYSTEM AND METHOD FOR TRANSMISSION AND DETECTION OF FRAME INCLUDING BURSTS OF PULSES

CROSS-REFERENCE TO A RELATED APPLICATION

This application claims the benefit of the filing date of Provisional Patent Application Ser. No. 61/230,312, filed on Jul. 31, 2009, and entitled "Transmission Frame with Bursty Preamble," which is incorporated herein by reference.

FIELD

The present disclosure relates generally to communication systems, and in particular, to a system and method for transmission and detection of frame including one or more bursts of pulses.

BACKGROUND

In communication systems, signals are often transmitted from a source communication device to a target communication device via a wireless or free space medium. These communication devices typically employ a transmitter for transmitting signals long distances via the wireless medium. In many cases, the transmitter is operated continuously, whether or not signals are being transmitted. In some cases, operating a transmitter in a continuous manner may be acceptable. However, when the power source is limited, this may not be desirable since the communication device may not be operated continuously for a desirable long time.

For instance, many communication devices are portable, such as cellular telephones, personal digital assistants (PDAs), handheld devices, and other devices. Portable communication devices typically rely on a limited power source, such as a battery, to perform the various intended operations. A limited power source typically has a continuous use lifetime that depends on the amount of power used by the portable device. It is generally desirable to extend the continuous use lifetime as much as possible. Accordingly, portable communication devices are more frequently designed to consume less and less power.

One technique for operating a transmitter in a more power efficient manner is to use pulse-based modulation techniques (e.g., pulse-position modulation) to transmit signals. In such a system, a transmitter may be operated in a relatively high power consumption mode during the transmission of a pulse signal. However, when the transmitter is not being used to transmit the pulse signal, it is operated in a relatively low power consumption mode in order to conserve power. Data, in the form of pulses, may be transmitted in frames. In such a case, a receiver needs to detect the frames in order to extract the data.

SUMMARY

An aspect of the disclosure relates to a method for wireless communications, comprising transmitting a first signal including one or more bursts of pulses during a first portion of a transmission frame, and not transmitting the first signal during a second portion of the transmission frame. In another aspect, not transmitting the first signal comprises maintaining one or more silence periods for the second portion of the transmission frame. In yet another aspect, not transmitting the first signal comprises transmitting a second signal distinct from the first signal. In this regards, the first signal may have a frequency spectrum substantially distinct from the frequency spectrum of the second signal. Additionally, the frequency spectrum of the first signal may be an ultra-wideband (UWB) spectrum.

In another aspect of the disclosure, the first portion of the transmission frame is situated within a preamble of the transmission frame. In another aspect, the second portion of the transmission frame comprises the portion of the frame remaining from the first portion. In yet another aspect, the second portion of the transmission frame is situated within a preamble of the transmission frame. In still another aspect, the method may further include transmitting a data payload within a third portion of the transmission frame.

In another aspect of the disclosure, the one or more bursts of pulses each comprises N uniformly-spaced pulses with a pulse repetition period of $T_P$. In another aspect, the one or more bursts of pulses each comprises N pulses sent in a time hopping fashion. In yet another aspect, the one or more bursts of pulses each comprises N pulses sent in a pulse position modulation fashion. In still another aspect, the one or more bursts of pulses each comprises a pseudo-random sequence of pulses. In other aspects, the same pseudo-random sequence of pulses is used across multiple bursts within a preamble of the transmission frame. In other aspects, the pseudo-random sequence of pulses is generated from a seed shared with a second apparatus that will use the seed to detect the pseudo-random sequence.

In another aspect of the disclosure, the length of the at least one silence period is at least 10 times greater than a length of at least one burst of pulses. In still another aspect, the length of at least one silence period is greater than 700 microseconds, and the length of at least one burst of pulses is less than 60 microseconds.

Other aspects, advantages and novel features of the present disclosure will become apparent from the following detailed description of the disclosure when considered in conjunction with the accompanying drawings.

DETAILED DESCRIPTION

Various aspects of the disclosure are described below. It should be apparent that the teachings herein may be embodied in a wide variety of forms and that any specific structure, function, or both being disclosed herein are merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein.

Figure 1:
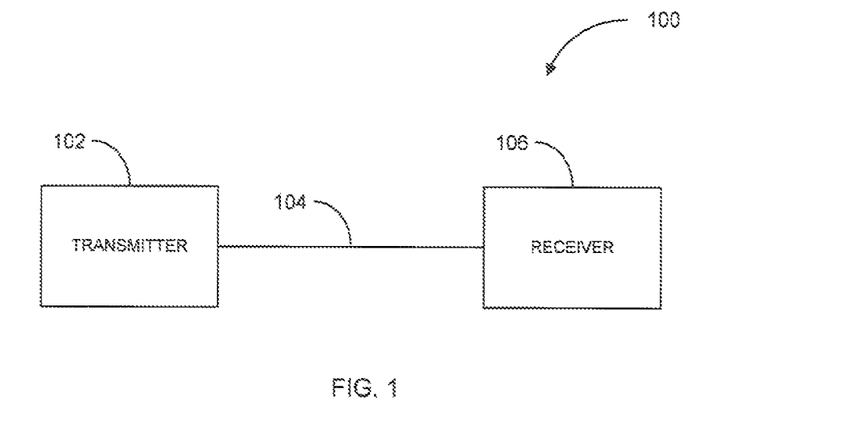
FIG. 1 illustrates a block diagram of an exemplary communication system in accordance with an aspect of the disclosure.

FIG. 1 illustrates a block diagram of an exemplary communication system 100 in accordance with an aspect of the disclosure. The communication system 100 comprises a transmitter 102 and a receiver 106. The transmitter 102 is coupled to the receiver 106 by way of a communication medium 104, which could be a wireless or wired medium. As discussed in more detail herein, the transmitter 102 may be adapted to transmit information to the receiver 106 organized in one or more frames.

In order to extract data from the frames, the receiver 106 may be configured to detect the frames. In this regards, the transmitter 102 may be configured to transmit a signal comprising one or more bursts of pulses during a first portion of the frame, and not transmit the one or more bursts of pulses during a second portion of the frame. The receiver 106 uses the one or more bursts of pulses to detect the frame. If the frame also includes data, the receiver 106 may extract the data from the frame after it has detected the frame using the one or more bursts of pulses. Various implementations and techniques in accordance with this theme are discussed further herein in more detail.

Figure 2:
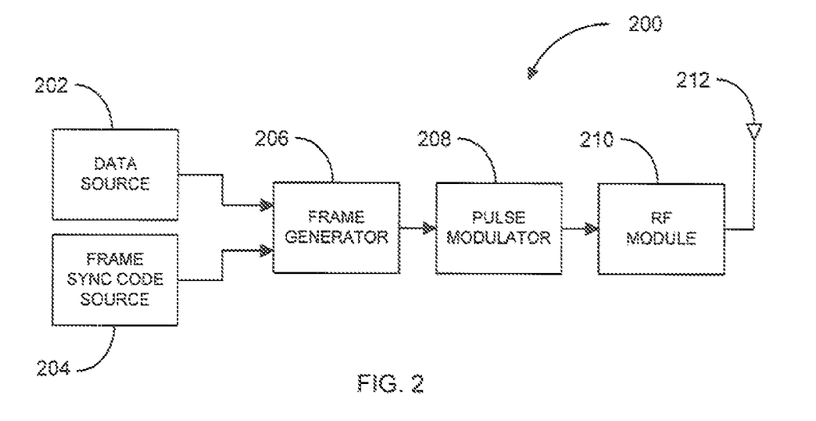
FIG. 2 illustrates a block diagram of an exemplary transmitter in accordance with another aspect of the disclosure.

FIG. 2 illustrates a block diagram of an exemplary transmitter 200 in accordance with another aspect of the disclosure. In summary, the transmitter 200 is configured to generate one or more frames for transmission to a receiver. Each frame includes one or more bursts of pulses in a first portion of the frame, and other signal or silence in a second portion of the frame. As discussed above, a receiver uses the one or more bursts of pulses to detect the frame. Once it has detected the frame, the receiver may extract data from the frame, if data is present in the frame.

In particular, the transmitter 200 comprises a data source 202, a frame synchronization code source 204, a frame generator 206, a pulse modulator 208, a radio frequency (RF) module 210, and an antenna 212. The data source 202 generates data for transmission to a receiver via one or more frames. The frame synchronization code source 204 generates a synchronization code for transmission to a receiver via each frame. The receiver uses the synchronization code in order to detect the corresponding frame or a subsequently received frame. In each frame, the synchronization code takes the form of one or more bursts of pulses situated within a first portion of the frame.

As discussed in more detail further herein, each burst of pulses may be configured in many distinct manners. For example, each burst of pulses may take the form of substantially N uniformly-spaced pulses. Alternatively, each burst of pulses may take the form of a plurality of pulses transmitted in a time hopping fashion. Alternatively, each burst of pulses may take the form of a plurality of pulses transmitted in a pulse position modulation fashion. Alternatively, each burst of pulses may take the form of a pseudo-random sequence of pulses. Any combination thereof or other pulse burst configurations may be used. Knowing the configuration of each burst of pulses, a receiver may detect a frame by recognizing the burst.

The frame generator 206 generates a transmission frame from data from the data source 202 and the synchronization code from the frame synchronization code source 204. It shall be understood that a transmission frame need not include data. Once the transmission frame has been defined, the frame generator 206 provides the frame information to the pulse modulator 208 which generates pulses based on the defined frame. The pulse modulator 208 may use a number of distinct pulse modulation techniques to generate the frame pulses for transmission, some of which are discussed with reference to FIGS. 16A-16D. The RF module 210 conditions the frame pulses (e.g., filters, amplifies, etc.) for transmission, and the antenna 212 radiates the conditioned frame pulses for transmission to a receiver via the wireless medium.

Figure 3:
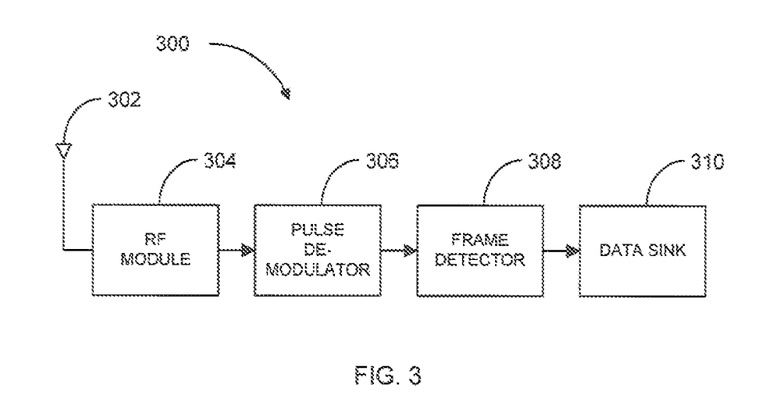
FIG. 3 illustrates a block diagram of an exemplary receiver in accordance with another aspect of the disclosure.

FIG. 3 illustrates a block diagram of an exemplary receiver 300 in accordance with another aspect of the disclosure. In summary, the receiver 300 is configured to receive one or more frames from a transmitter, such as transmitter 200. As discussed above, each frame includes one or more bursts of pulses in a first portion of the frame, and other signal or silence in a second portion of the frame. The receiver 300 analyzes the received one or more bursts of pulses to subsequently detect the frame. Once it has detected the frame, the receiver 300 may extract data from the frame, if data is present in the frame.

In particular, the receiver 300 comprises an antenna 302, an RF module 304, a pulse demodulator 306, a frame detector 308, and a data sink 310. The antenna 302 picks up the signal transmitted by the receiver via the wireless medium. The RF module 304 conditions the received signal (e.g., filters, amplifies, etc.) for improved processing thereof downstream. The pulse demodulator 306 demodulates the pulses to generate a baseband signal. The frame detector 308 analyzes the baseband signal in order to detect one or more bursts of pulses. By having pre-knowledge of the frame structure, the frame detector 308 is able to detect the frame by detecting the one or more bursts of pulses. Once the frame detector 308 has detected the frame, it may be able to extract data from the frame, if data is present in the frame. Once the data has been extracted, the frame detector 308 sends it to the data sink 310.

Figure 4:
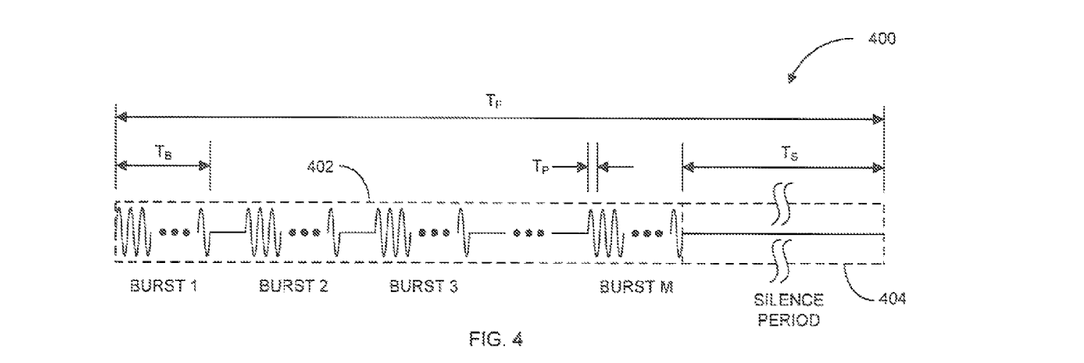
FIG. 4 illustrates a diagram of an exemplary frame in accordance with another aspect of the disclosure.

FIG. 4 illustrates a diagram of an exemplary frame 400 in accordance with another aspect of the disclosure. As shown in the diagram, the frame 400 is organized into a first portion 402 and a second portion 404. The first portion 402 of the frame 400 includes a plurality of bursts of pulses 1-M. The bursts 1-M are substantially equally spaced in time, with a relatively short silence period separating adjacent bursts of pulses. The second portion 402 includes a relatively long silence period (i.e., a period where the transmitter is not transmitting any signal).

As an example, the length $T_F$ of the frame may be 768 microseconds (μs). The length $T_B$ of each burst of pulses may be 51.2 μs. The length $T_S$ of the silence period 404 may be 716.8 μs. The length $T_P$ of each pulse may be 200 nanoseconds (ns). And, the number N pulses within each burst may be 256. It shall be understood that the frame 400 including each of these parameters may be configured differently.

Figure 5:
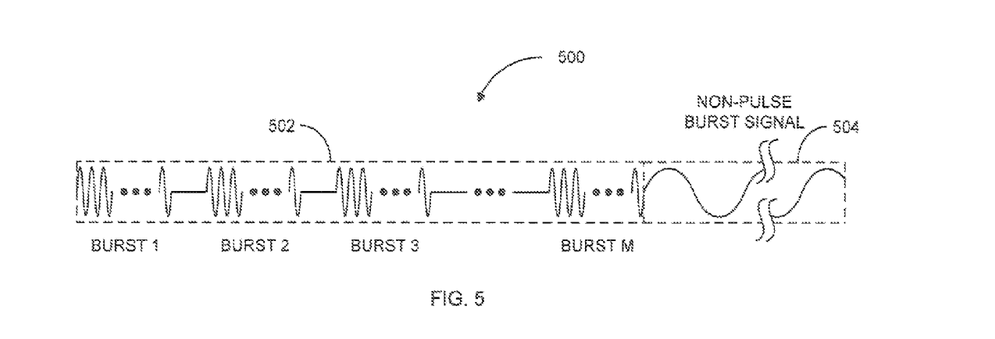
FIG. 5 illustrates a diagram of another exemplary frame in accordance with another aspect of the disclosure.

FIG. 5 illustrates a diagram of another exemplary frame in accordance with another aspect of the disclosure. As shown in the diagram, the frame 500 is organized into a first portion 502 and a second portion 504. The first portion 502 of the frame 500 includes a plurality of bursts of pulses 1-M. The bursts 1-M are substantially equally spaced in time, with a relatively short silence period separating adjacent bursts of pulses. The second portion 504 includes a signal that is distinct from the bursts of pulses. For instance, the frequency spectrum of the burst of pulses may be distinct from the frequency spectrum of the signal in the second portion 504. As an example, the pulses in the burst may have an ultra-wideband (UWB) spectrum, whereas the signal in the second portion 504 may have a smaller and lower-frequency bandwidth.

Figure 6:
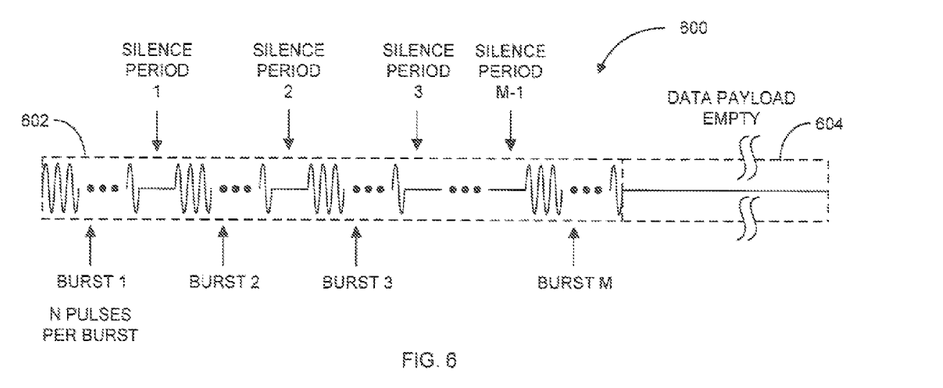
FIG. 6 illustrates a diagram of another exemplary frame in accordance with another aspect of the disclosure.

FIG. 6 illustrates a diagram of an exemplary frame 600 in accordance with another aspect of the disclosure. As shown in the diagram, the frame 600 is organized into a preamble 602 and a data payload portion 604. The preamble 602 of the frame 600 includes a plurality of bursts of pulses 1-M. The bursts 1-M are substantially equally spaced in time, with relatively short silence periods 1-(M−1) separating adjacent bursts of pulses, respectively. Each burst may include N number of pulses. The data payload portion 604 of the frame 600 is reserved for data. However, in this example, the data payload portion 604 is empty.

Figure 7:
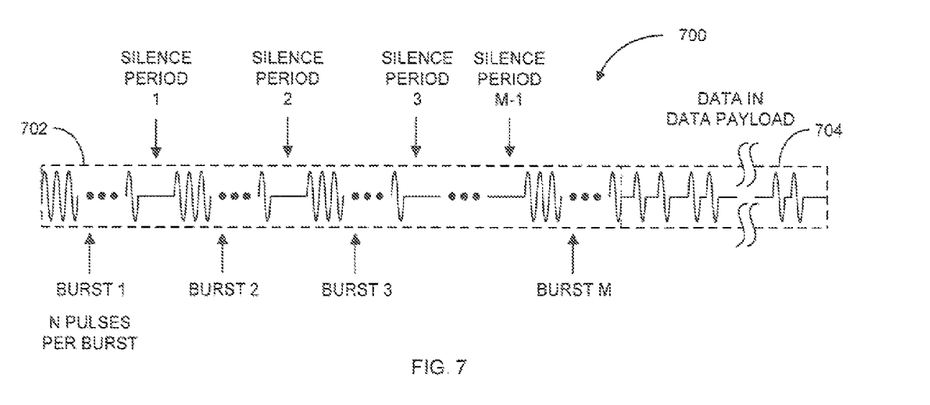
FIG. 7 illustrates a diagram of another exemplary frame in accordance with another aspect of the disclosure.

FIG. 7 illustrates a diagram of an exemplary frame 700 in accordance with another aspect of the disclosure. As shown in the diagram, the frame 700 is organized into a preamble 702 and a data payload portion 704. The preamble 702 of the frame 600 includes a plurality of bursts of pulses 1-M. The bursts 1-M are substantially equally spaced in time, with relatively short silence periods 1-(M−1) separating adjacent bursts of pulses, respectively. Each burst may include N number of pulses. The data payload portion 704 of the frame 700 is reserved for data. In this example, the data payload 704 includes data in the form of pulses. As previously discussed, a number of pulse modulation techniques may be used for transmitting data from one device to another device.

Figure 8:
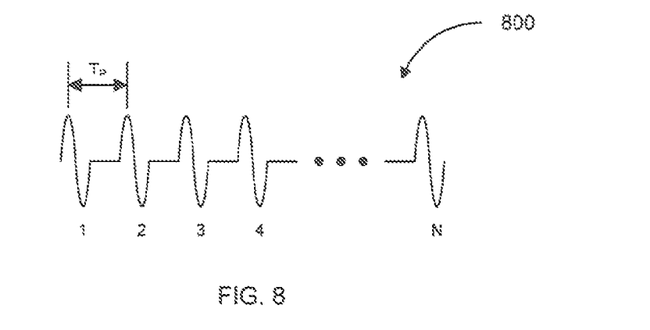
FIG. 8 illustrates a diagram of an exemplary burst of pulses in accordance with another aspect of the disclosure.

FIG. 8 illustrates a diagram of an exemplary burst of pulses 800 in accordance with another aspect of the disclosure. In this example, the burst 800 includes N number of substantially uniformly-spaced pulses. The burst 800 may have a defined pulse repetition period $T_P$. As previously discussed, a receiver may be able to detect one or more bursts each having this pattern of N pulses with the defined pulse repetition period $T_P$ in order to detect the corresponding frame or a subsequent frame.

Figure 9:
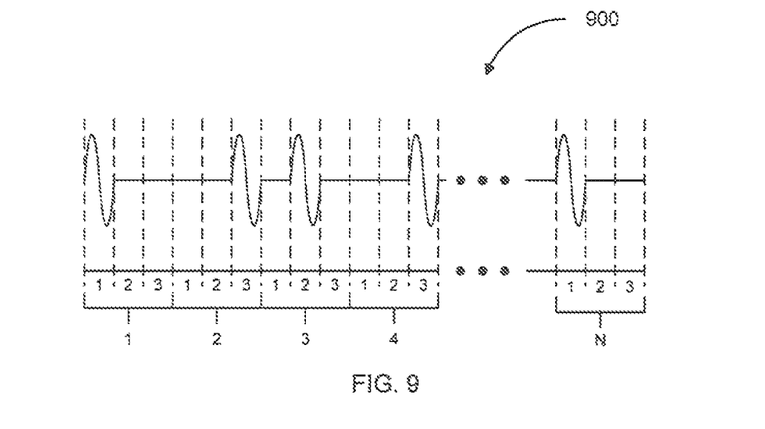
FIG. 9 illustrates a diagram of another exemplary burst of pulses in accordance with another aspect of the disclosure.

FIG. 9 illustrates a diagram of another exemplary burst of pulses 900 in accordance with another aspect of the disclosure. In this example, the burst 900 includes pulses transmitted in a time hopping fashion. There are N number of time hopping intervals. One pulse may transmitted within one of three subintervals 1-3 within each hopping interval. For example, in the first time hopping interval, a pulse is transmitted within the first subinterval. In the second time hopping interval, a pulse is transmitted within the third subinterval. In the third time hopping interval, a pulse is transmitted within the second subinterval, and so on as indicated in the diagram. It shall be understood that the time hopping may be configured in a number of different manners, such having more or less time hopping intervals and having more or less subintervals. As previously discussed, a receiver may be able to detect one or more bursts each having the defined time hopping pattern in order to detect the corresponding frame or a subsequent frame.

The pulses transmitted in a time hopping fashion may be configured to form a pseudo-random sequence. The pseudo-random sequence of pulses may be transmitted across multiple bursts within a preamble of the transmission frame. Additionally, the pseudo-random sequence may be generated from a seed shared by both the transmitter and receiver. In this case, the receiver uses the seed to detect the pseudo-random sequence, and ultimately, the transmission frame.

Figure 10:
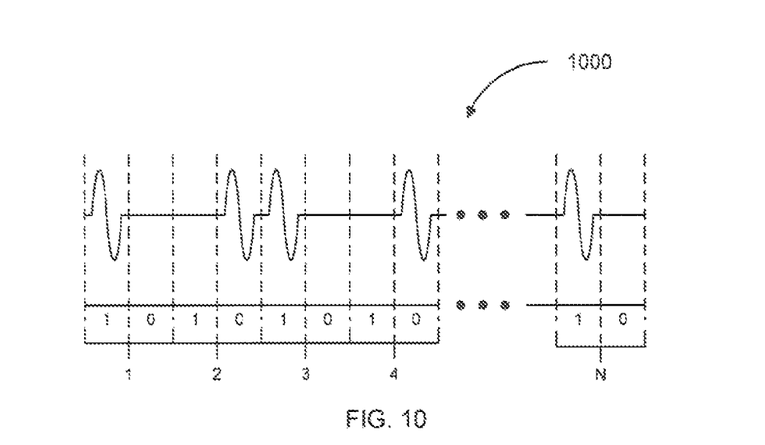
FIG. 10 illustrates a diagram of another exemplary burst of pulses in accordance with another aspect of the disclosure.

FIG. 10 illustrates a diagram of another exemplary burst of pulses in accordance with another aspect of the disclosure. In this example, the burst 1000 includes pulses transmitted in a pulse position modulation fashion. There are N number of time pulse position intervals. One pulse may transmitted within one of two subintervals 1-2 within each pulse position interval. For example, in the first pulse position interval, a pulse is transmitted within the first subinterval (e.g., which may indicate a logic one). In the second pulse position interval, a pulse is transmitted within the second subinterval (e.g., which may indicate a logic zero). In the third pulse position interval, a pulse is transmitted within the first subinterval (e.g., which may indicate a logic one), and so on as indicated in the diagram. It shall be understood that the pulse position modulation may be configured in a number of different manners, some of which are described and shown with respect to FIGS. 16A-16D. As previously discussed, a receiver may be able to detect one or more bursts each having a defined pulse position modulation pattern in order to detect the corresponding frame or a subsequent frame.

The pulses transmitted in a pulse position modulation fashion may be configured to form a pseudo-random sequence. The pseudo-random sequence of pulses may be transmitted across multiple bursts within a preamble of the transmission frame. Additionally, the pseudo-random sequence may be generated from a seed shared by both the transmitter and receiver. In this case, the receiver uses the seed to detect the pseudo-random sequence, and ultimately, the transmission frame. Furthermore, the pulses may be transmitted by way using a combination of pulse position modulation and time-hopping sequence, or other combinations.

Figure 11:
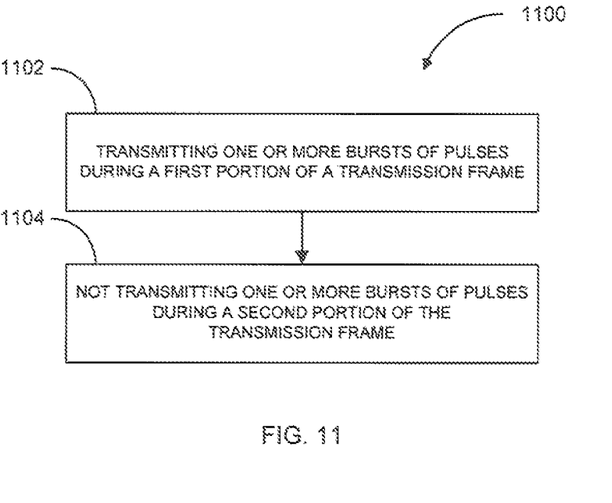
FIG. 11 illustrates a flow diagram of an exemplary method of transmitting a frame in accordance with another aspect of the disclosure.

FIG. 11 illustrates a flow diagram of an exemplary method 1100 of transmitting a frame in accordance with another aspect of the disclosure. According to the method 1100, one or more bursts of pulses are transmitted during a first portion of a transmission frame (block 1102). As previously discussed, the first portion may be situated within the preamble of the transmission frame. Each burst of pulses may be defined and known by a receiving device. The receiving device may recognize and detect the one or more bursts of pulses to ultimately detect the transmission frame, and extract any data from the frame. Further, in accordance with the method 1100, the one or more bursts of pulses are not transmitted during a second portion of the transmission frame (block 1104). As previously discussed, the second portion may be the portion of the transmission frame remaining from the first portion. Alternatively, the second portion of the transmission frame may also be situated within the preamble, and may be situated between adjacent bursts of pulses. The second portion may consists entirely of a silence period where no signal is being transmitted. Or, the second portion may include a signal distinct in frequency or in other aspect from the signal comprising the burst of pulses.

Figure 12:
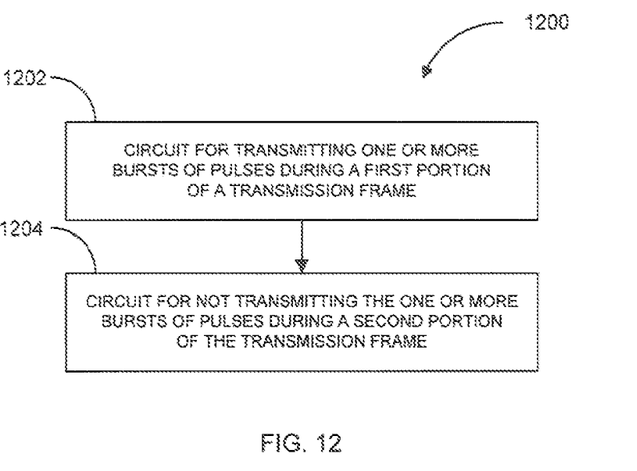
FIG. 12 illustrates a block diagram of an exemplary apparatus for transmitting a frame in accordance with another aspect of the disclosure.

FIG. 12 illustrates a block diagram of an exemplary apparatus 1200 for transmitting a transmission frame in accordance with another aspect of the disclosure. The apparatus may be an exemplary implementation used to perform the operations in accordance with the method 1100. In particular, the apparatus 1200 includes a circuit 1202 for transmitting one or more bursts of pulses during a first portion of a transmission frame. The apparatus 1200 further includes a circuit 1204 for not transmitting the one or more bursts of pulses during a second portion of the transmission frame. It shall be understood that a "means" may comprise a circuit, device, processor, and other components.

Figure 13:
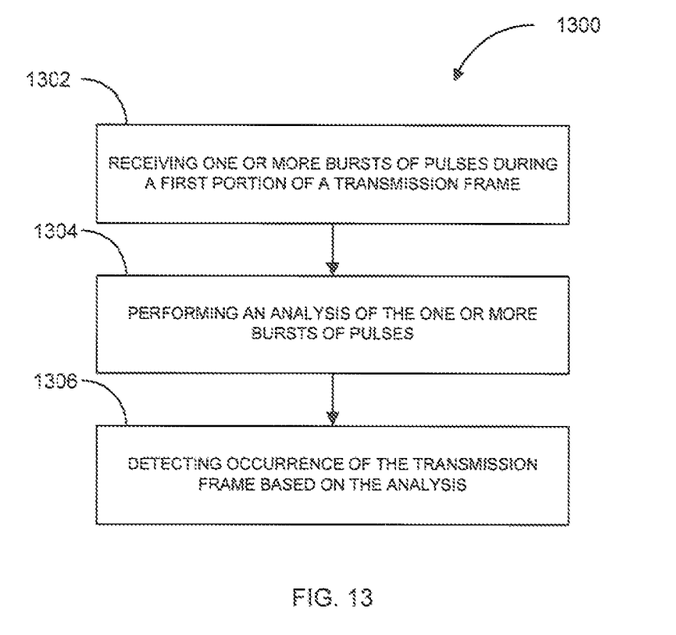
FIG. 13 illustrates a flow diagram of an exemplary method of detecting a frame in accordance with another aspect of the disclosure.

FIG. 13 illustrates a flow diagram of an exemplary method 1300 for detecting a transmission frame in accordance with another aspect of the disclosure. According to the method 1300, one or more bursts of pulses are received during a first portion of a transmission frame (block 1302). Then, according to the method 1300, the one or more bursts of pulses are analyzed (block 1304). Then, the transmission frame is detected based on the analysis of the one or more bursts of pulses (block 1306).

Figure 14:
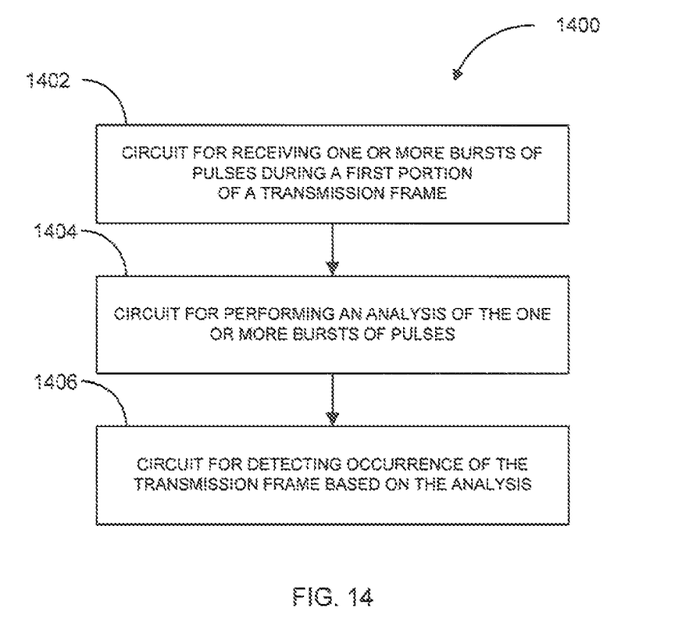
FIG. 14 illustrates a block diagram of an exemplary apparatus for detecting a frame in accordance with another aspect of the disclosure.

FIG. 14 illustrates a block diagram of an exemplary apparatus 1400 for detecting a transmission frame in accordance with another aspect of the disclosure. The apparatus 1400 may be an exemplary implementation used to perform the operations in accordance with the method 1300. In particular, the apparatus 1400 includes a circuit 1402 for receiving one or more bursts of pulses during a first portion of a transmission frame. The apparatus 1400 further includes a circuit 1404 for performing an analysis of the one or more bursts of pulses. Additionally, the apparatus 1400 includes a circuit 1406 for detecting the occurrence of the transmission frame based on the analysis of the one or more bursts of pulses.

Figure 15:
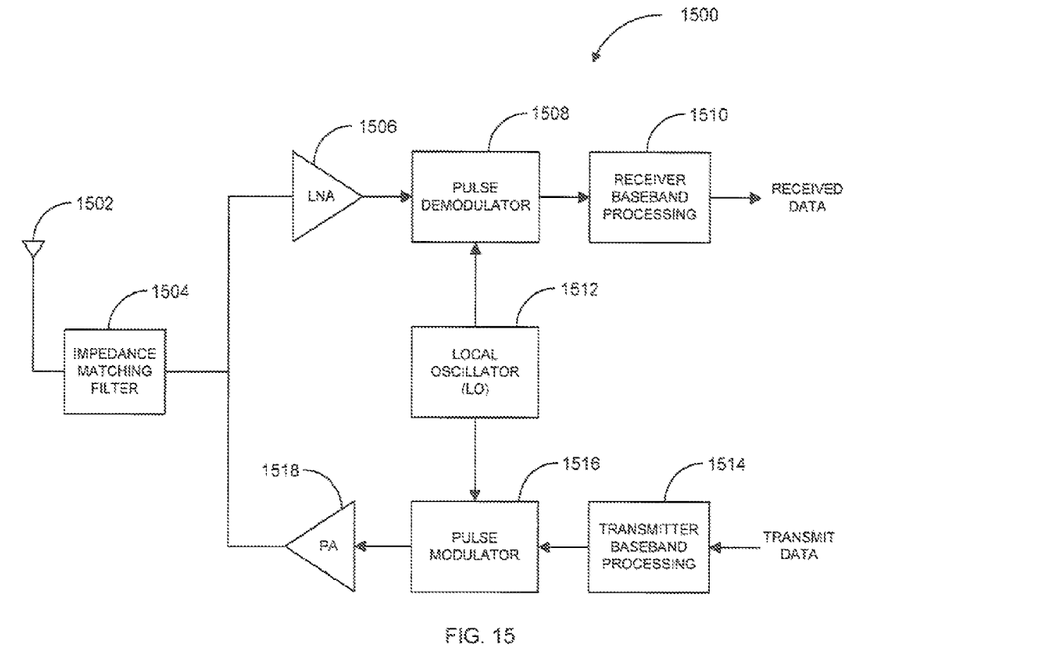
FIG. 15 illustrates a block diagram of an exemplary transceiver system in accordance with another aspect of the disclosure.

FIG. 15 illustrates a block diagram of an exemplary communication device 1500 in accordance with another aspect of the disclosure. The communication device 1500 may be one exemplary implementation of a communication device that uses any of the apparatuses previously discussed to transmit and/or detect a transmission frame. In particular, the communication device 1500 comprises an antenna 1502, an impedance matching filter 1504, a low noise amplifier (LNA) 1506, a pulse demodulator 1508, a receiver baseband processing module 1510, a local oscillator (LO) 1512, a transmitter baseband processing module 1514, a pulse modulator 1516, and a power amplifier (PA) 1518.

As a transmitting communication device, data to be transmitted to a destination communication device is sent to the transmitter baseband processing module 1514. The transmitter baseband processing module 1514 processes the transmit data to generate an outbound transmission frame, as previously described. Using the LO signal generated by the oscillator 1512, the pulse modulator 1516 generates pulses (e.g., ultra wideband (UWB) pulses) based on the outbound transmission frame. The pulses are amplified by the power amplifier 1518 and then sent to the antenna 1502 via the impedance matching filter 1504 transmission into the wireless medium. The transmit data may be generated by a sensor, a microprocessor, a microcontroller, a RISC processor, a keyboard, a pointing device such as a mouse or a track ball, an audio device, such as a headset, including a transducer such as a microphone, a medical device, a shoe, a robotic or mechanical device that generates data, a user interface, such as a touch-sensitive display, etc.

As a receiving communication device, a received RF signal is picked up by the antenna 1502 and applied to the LNA 1506 by way of the impedance matching filter 1504. The LNA 1506 amplifies the received RF signal. Using the LO signal generated by the oscillator 1512, the pulse demodulator 1508 generates an inbound baseband signal based on the received UWB pulses. The receiver baseband processing 1510 detects the one or more burst of pulses in the received signal, in order to detect the transmission frame and extract the received data from the frame, as previously discussed. A data processor (not shown) may then perform one or more defined operations based on the received data. For example, the data processor may include a microprocessor, a microcontroller, a reduced instruction set computer (RISC) processor, a display, an audio device, such as a headset, including a transducer such as speakers, a medical device, a shoe, a watch, a robotic or mechanical device responsive to the data, a user interface, such as a display, one or more light emitting diodes (LED), etc.

Figure 16A:
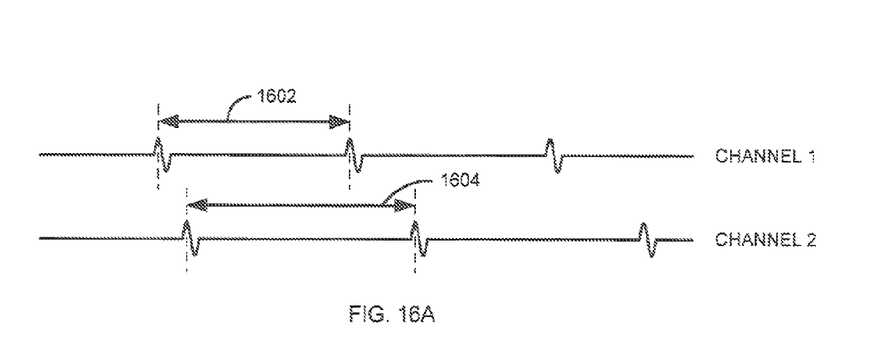
FIGS. 16A-D illustrate timing diagrams of various pulse modulation techniques in accordance with another aspect of the disclosure.

FIG. 16A illustrates different channels (channels 1 and 2) defined with different pulse repetition frequencies (PRF) as an example of a pulse modulation that may be employed in any of the communications systems, devices, and apparatuses described herein. Specifically, pulses for channel 1 have a pulse repetition frequency (PRF) corresponding to a pulse-to-pulse delay period 1602. Conversely, pulses for channel 2 have a pulse repetition frequency (PRF) corresponding to a pulse-to-pulse delay period 1604. This technique may thus be used to define pseudo-orthogonal channels with a relatively low likelihood of pulse collisions between the two channels. In particular, a low likelihood of pulse collisions may be achieved through the use of a low duty cycle for the pulses. For example, through appropriate selection of the pulse repetition frequencies (PRF), substantially all pulses for a given channel may be transmitted at different times than pulses for any other channel.

The pulse repetition frequency (PRF) defined for a given channel may depend on the data rate or rates supported by that channel. For example, a channel supporting very low data rates (e.g., on the order of a few kilobits per second or Kbps) may employ a corresponding low pulse repetition frequency (PRF)). Conversely, a channel supporting relatively high data rates (e.g., on the order of a several megabits per second or Mbps) may employ a correspondingly higher pulse repetition frequency (PRF).

Figure 16B:
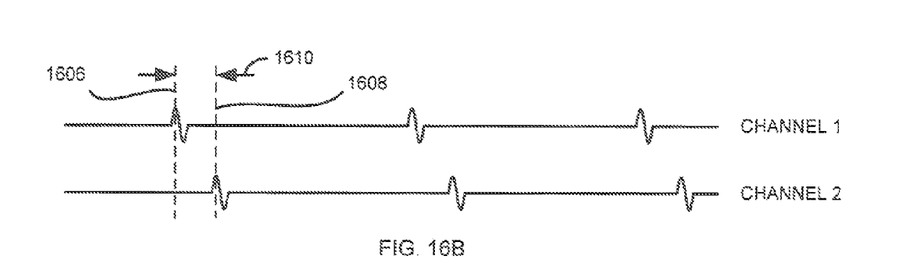

FIG. 16B illustrates different channels (channels 1 and 2) defined with different pulse positions or offsets as an example of a modulation that may be employed in any of the communications systems described herein. Pulses for channel 1 are generated at a point in time as represented by line 1606 in accordance with a first pulse offset (e.g., with respect to a given point in time, not shown). Conversely, pulses for channel 2 are generated at a point in time as represented by line 1608 in accordance with a second pulse offset. Given the pulse offset difference between the pulses (as represented by the arrows 1610), this technique may be used to reduce the likelihood of pulse collisions between the two channels. Depending on any other signaling parameters that are defined for the channels (e.g., as discussed herein) and the precision of the timing between the devices (e.g., relative clock drift), the use of different pulse offsets may be used to provide orthogonal or pseudo-orthogonal channels.

Figure 16C:
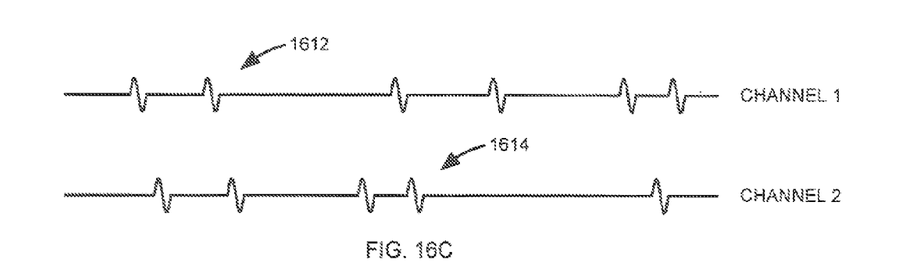

FIG. 16C illustrates different channels (channels 1 and 2) defined with different timing hopping sequences that may be employed in any of the communications systems described herein. For example, pulses 1612 for channel 1 may be generated at times in accordance with one time hopping sequence while pulses 1614 for channel 2 may be generated at times in accordance with another time hopping sequence. Depending on the specific sequences used and the precision of the timing between the devices, this technique may be used to provide orthogonal or pseudo-orthogonal channels. For example, the time hopped pulse positions may not be periodic to reduce the possibility of repeat pulse collisions from neighboring channels.

Figure 16D:
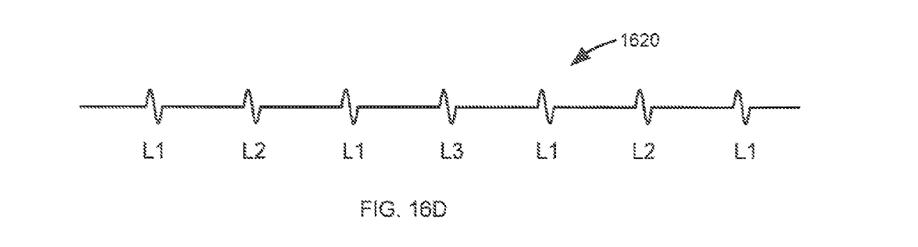

FIG. 16D illustrates different channels defined with different time slots as an example of a pulse modulation that may be employed in any of the communications systems described herein. Pulses for channel L1 are generated at particular time instances. Similarly, pulses for channel L2 are generated at other time instances. In the same manner, pulses for channel L3 are generated at still other time instances. Generally, the time instances pertaining to the different channels do not coincide or may be orthogonal to reduce or eliminate interference between the various channels.

It should be appreciated that other techniques may be used to define channels in accordance with a pulse modulation schemes. For example, a channel may be defined based on different spreading pseudo-random number sequences, or some other suitable parameter or parameters. Moreover, a channel may be defined based on a combination of two or more parameters.

Figure 17:
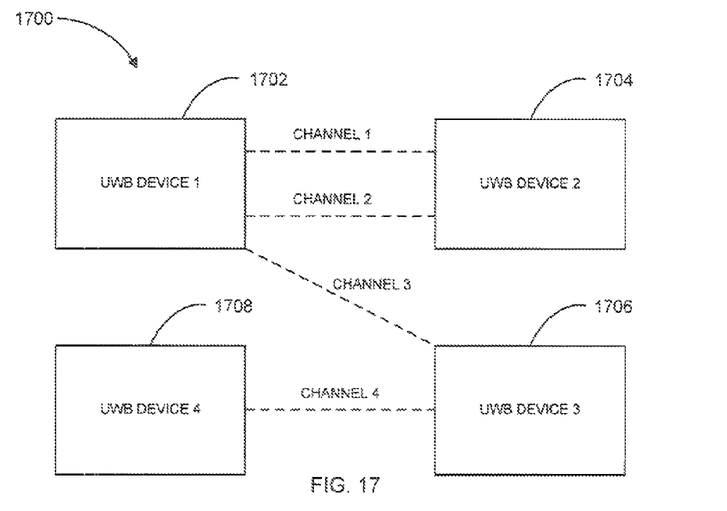
FIG. 17 illustrates a block diagram of various communication devices communicating with each other via various channels in accordance with another aspect of the disclosure.

FIG. 17 illustrates a block diagram of various ultra-wide band (UWB) communications devices communicating with each other via various channels in accordance with another aspect of the disclosure. For example, UWB device 1 1702 is communicating with UWB device 2 1704 via two concurrent UWB channels 1 and 2. UWB device 1702 is communicating with UWB device 3 1706 via a single channel 3. And, UWB device 3 1706 is, in turn, communicating with UWB device 4 1708 via a single channel 4. Other configurations are possible. The communications devices may be used for many different applications, and may be implemented, for example, in a headset, microphone, biometric sensor, heart rate monitor, pedometer, EKG device, watch, shoe, remote control, switch, tire pressure monitor, or other communications devices. A medical device may include smart band-aid, sensors, vital sign monitors, and others. The communications devices described herein may be used in any type of sensing application, such as for sensing automotive, athletic, and physiological (medical) responses.

Any of the above aspects of the disclosure may be implemented in many different devices. For example, in addition to medical applications as discussed above, the aspects of the disclosure may be applied to health and fitness applications. Additionally, the aspects of the disclosure may be implemented in shoes for different types of applications. There are other multitudes of applications that may incorporate any aspect of the disclosure as described herein.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences. In some aspects concurrent channels may be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

What is claimed is:

1. A method of wireless communications, comprising:
    transmitting a first signal to a remote apparatus by a first apparatus, the first signal comprising a plurality of bursts of pulses during a first portion of a defined transmission frame, wherein each burst of pulses comprises a defined pseudo-random sequence of pulses, the pseudo-random sequence being known to the remote apparatus through the use of a seed shared between the first apparatus and the remote apparatus, and wherein the plurality of bursts of pulses are arranged in a defined pattern; and
    not transmitting the first signal by the first apparatus during a second portion of the defined transmission frame, wherein the plurality of bursts of pulses are configured to allow the remote apparatus to identify the first and second portions of the defined transmission frame, and wherein the second portion is configured for including a data payload of the defined transmission frame.

2. The method of claim 1, wherein not transmitting the first signal comprises maintaining one or more silence periods for the second portion of the defined transmission frame.

3. The method of claim 1, wherein not transmitting the first signal comprises transmitting a second signal distinct from the first signal.

4. The method of claim 3, wherein a first frequency spectrum of the first signal is substantially distinct from a second frequency spectrum of the second signal.

5. The method of claim 4, wherein the first frequency spectrum of the first signal comprises an ultra-wideband (UWB) spectrum.

6. The method of claim 1, wherein the first portion of the defined transmission frame is situated within a preamble of the defined transmission frame.

7. The method of claim 1, wherein the second portion of the defined transmission frame comprises a portion of the defined transmission frame remaining from the first portion.

8. The method of claim 1, wherein the second portion of the defined transmission frame is situated within a preamble of the defined transmission frame.

9. The method of claim 1, wherein the defined pseudo-random sequence of pulses comprises N pulses sent in a time hopping fashion.

10. The method of claim 1, wherein the defined pseudo-random sequence of pulses comprises N pulses sent in a pulse position modulation fashion.

11. The method of claim 1, wherein the pseudo-random sequence of pulses is used across multiple bursts within a preamble of the defined transmission frame.

12. The method of claim 2, wherein a length of at least one silence period is at least 10 times greater than a length of at least one burst of pulses.

13. The method of claim 2, wherein a length of at least one silence period is greater than 700 us and the length of at least one burst of pulses is less than 60 us.

14. The method of claim 1, further comprising transmitting the data payload within the second portion of the defined transmission frame.

15. An apparatus for wireless communications, comprising:
    means for transmitting a first signal to a remote apparatus, the first signal comprising a plurality of bursts of pulses during a first portion of a defined transmission frame, wherein each burst of pulses comprises a defined pseudo-random sequence of pulses, the pseudo-random sequence being known to the remote apparatus through the use of a seed shared between the apparatus and the remote apparatus, and wherein the bursts of pulses are arranged in a defined pattern; and
    means for not transmitting the first signal during a second portion of the defined transmission frame, wherein the plurality of bursts of pulses are configured to allow the remote apparatus to identify the first and second portions of the defined transmission frame, and wherein the second portion is configured for including a data payload of the defined transmission frame.

16. The apparatus of claim 15, wherein the means for not transmitting the first signal comprises means for maintaining one or more silence periods for the second portion of the defined transmission frame.

17. The apparatus of claim 15, wherein the means for not transmitting the first signal comprises means for transmitting a second signal distinct from the first signal.

18. The apparatus of claim 17, wherein a first frequency spectrum of the first signal is substantially distinct from a second frequency spectrum of the second signal.

19. The apparatus of claim 18, wherein the first frequency spectrum of the first signal comprises an ultra-wideband (UWB) spectrum.

20. The apparatus of claim 15, wherein the first portion of the defined transmission frame is situated within a preamble of the defined transmission frame.

21. The apparatus of claim 15, wherein the second portion of the defined transmission frame comprises a portion of the defined transmission frame remaining from the first portion.

22. The apparatus of claim 15, wherein the second portion of the defined transmission frame is situated within a preamble of the defined transmission frame.

23. The apparatus of claim 15, wherein the defined pseudo-random sequence of pulses comprises N pulses sent in a time hopping fashion.

24. The apparatus of claim 15, wherein the defined pseudo-random sequence of pulses comprises N pulses sent in a pulse position modulation fashion.

25. The apparatus of claim 15, wherein the pseudo-random sequence of pulses is used across multiple bursts within a preamble of the defined transmission frame.

26. The apparatus of claim 16, wherein a length of at least one silence period is at least 10 times greater than a length of at least one burst of pulses.

27. The apparatus of claim 16, wherein a length of at least one silence period is greater than 700 us and the length of at least one burst of pulses is less than 60 us.

28. The apparatus of claim 15, further comprising means for transmitting the data payload within the second portion of the defined transmission frame.

29. An apparatus for wireless communications, comprising:
a transmitter adapted to:
transmit a first signal to a remote apparatus, the first signal comprising a plurality of bursts of pulses during a first portion of a defined transmission frame, wherein each burst of pulses comprises a defined pseudo-random sequence of pulses, the pseudo-random sequence being known to the remote apparatus through the use of a seed shared between the apparatus and the remote apparatus, and wherein the bursts of pulses are arranged in a defined pattern; and
not transmit the first signal during a second portion of the defined transmission frame, wherein the plurality of bursts of pulses are configured to allow the remote apparatus to identify the first and second portions of the defined transmission frame, and wherein the second portion is configured for including a data payload of the defined transmission frame.

30. The apparatus of claim 29, wherein the transmitter is adapted to maintain one or more silence periods for the second portion of the defined transmission frame.

31. The apparatus of claim 29, wherein the transmitter is adapted to transmit a second signal distinct from the first signal during the second portion of the defined transmission frame.

32. The apparatus of claim 31, wherein a first frequency spectrum of the first signal is substantially distinct from a second frequency spectrum of the second signal.

33. The apparatus of claim 31, wherein the first frequency spectrum of the first signal comprises an ultra-wideband (UWB) spectrum.

34. The apparatus of claim 29, wherein the first portion of the defined transmission frame is situated within a preamble of the defined transmission frame.

35. The apparatus of claim 29, wherein the second portion of the defined transmission frame comprises a portion of the defined transmission frame remaining from the first portion.

36. The apparatus of claim 29, wherein the second portion of the defined transmission frame is situated within a preamble of the defined transmission frame.

37. The apparatus of claim 29, wherein the defined pseudo-random sequence of pulses comprises N pulses sent in a time hopping fashion.

38. The apparatus of claim 29, wherein the defined pseudo-random sequence of pulses comprises N pulses sent in a pulse position modulation fashion.

39. The apparatus of claim 29, wherein the pseudo-random sequence of pulses is used across multiple bursts within a preamble of the defined transmission frame.

40. The apparatus of claim 30, wherein a length of at least one silence period is at least 10 times greater than a length of at least one burst of pulses.

41. The apparatus of claim 30, wherein a length of at least one silence period is greater than 700 us and the length of at least one burst of pulses is less than 60 us.

42. The apparatus of claim 30, wherein the transmitter is adapted to transmit the data payload within the second portion of the defined transmission frame.

43. A computer program product including a computer readable storage device comprising instructions executable by an apparatus to:
transmit a first signal to a remote apparatus, the first signal comprising a plurality of bursts of pulses during a first portion of a defined transmission frame, wherein each burst of pulses comprises a defined pseudo-random sequence of pulses, the pseudo-random sequence being known to the remote apparatus through the use of a seed shared between the apparatus and the remote apparatus, and wherein the bursts of pulses are arranged in a defined pattern; and
not transmit the first signal during a second portion of the defined transmission frame, wherein the plurality of bursts of pulses are configured to allow the remote apparatus to identify the first and second portions of the defined transmission frame, and wherein the second portion is configured for including a data payload of the defined transmission frame.

44. A headset, comprising:
a transducer adapted to generate audio data; and
a transmitter adapted to:
transmit a first signal to a remote apparatus, the first signal comprising a plurality of bursts of pulses during a first portion of a defined transmission frame, wherein each burst of pulses comprises a defined pseudo-random sequence of pulses, the pseudo-random sequence being known to the remote apparatus through the use of a seed shared between the headset and the remote apparatus, and wherein the bursts of pulses are arranged in a defined pattern;
not transmit the first signal during a second portion of the defined transmission frame, wherein the plurality of bursts of pulses are configured to allow the remote apparatus to identify the first and second portions of the defined transmission frame, and wherein the second portion is configured for including a data payload of the defined transmission frame; and
transmit the audio data as the data payload during the second portion of the defined transmission frame.

45. A user device, comprising:
a user interface adapted to generate data; and
a transmitter adapted to:
transmit a first signal to a remote apparatus, the first signal comprising a plurality of bursts of pulses during a first portion of a defined transmission frame, wherein each burst of pulses comprises a defined pseudo-random sequence of pulses, the pseudo-random sequence being known to the remote apparatus through the use of a seed shared between the user device and the remote apparatus, and wherein the bursts of pulses are arranged in a defined pattern;
not transmit the first signal during a second portion of the defined transmission frame, wherein the plurality of bursts of pulses are configured to allow the remote apparatus to identify the first and second portions of the defined transmission frame, and wherein the second portion is configured for including a data payload of the defined transmission frame; and
transmit the data during the second portion of the defined transmission frame.

46. A sensing device, comprising:
a sensor adapted to generate data; and
a transmitter adapted to:

transmit a first signal to a remote apparatus, the first signal comprising a plurality of bursts of pulses during a first portion of a defined transmission frame, wherein each burst of pulses comprises a defined pseudo-random sequence of pulses, the pseudo-random sequence being known to the remote apparatus through the use of a seed shared between the sensing device and the remote apparatus, and wherein the bursts of pulses are arranged in a defined pattern;

not transmit the first signal during a second portion of the defined transmission frame, wherein the plurality of bursts of pulses are configured to allow the remote apparatus to identify the first and second portions of the defined transmission frame, and wherein the second portion is configured for including a data payload of the defined transmission frame; and transmit the data during the second portion of the defined transmission frame.

* * * * *